(12) United States Patent
Zhai

(10) Patent No.: US 8,787,272 B2
(45) Date of Patent: Jul. 22, 2014

(54) GROUP SHARED DISTRIBUTED RESERVATION PROTOCOL

(75) Inventor: Hongqiang Zhai, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 323 days.

(21) Appl. No.: 13/055,165

(22) PCT Filed: Jul. 8, 2009

(86) PCT No.: PCT/IB2009/052975
§ 371 (c)(1),
(2), (4) Date: Jan. 21, 2011

(87) PCT Pub. No.: WO2010/013152
PCT Pub. Date: Feb. 4, 2010

(65) Prior Publication Data
US 2011/0158199 A1    Jun. 30, 2011

Related U.S. Application Data

(60) Provisional application No. 61/184,022, filed on Jun. 4, 2009, provisional application No. 61/084,071, filed on Jul. 28, 2008.

(51) Int. Cl.
| | |
|---|---|
| *H04W 72/04* | (2009.01) |
| *H04W 4/00* | (2009.01) |
| *H04J 3/06* | (2006.01) |
| *H04J 3/00* | (2006.01) |
| *H04B 15/00* | (2006.01) |
| *G01R 31/28* | (2006.01) |

(52) U.S. Cl.
USPC ........... 370/329; 370/510; 370/345; 370/346; 370/512; 455/502; 714/712

(58) Field of Classification Search
USPC ......... 370/328, 329, 338, 345, 347, 349, 361, 370/431, 441, 442, 443, 461; 714/704, 712
See application file for complete search history.

(56) References Cited

U.S. PATENT DOCUMENTS

| | | | |
|---|---|---|---|
| 7,107,498 B1* | 9/2006 | Schmidt et al. | 714/704 |
| 2007/0042795 A1* | 2/2007 | Mo et al. | 455/502 |
| 2008/0219222 A1* | 9/2008 | Lo et al. | 370/337 |
| 2009/0213771 A1* | 8/2009 | Celentano et al. | 370/310 |
| 2009/0274166 A1* | 11/2009 | Zhang et al. | 370/443 |
| 2009/0323697 A1* | 12/2009 | Celentano et al. | 370/395.42 |

FOREIGN PATENT DOCUMENTS

| | | |
|---|---|---|
| WO | WO03090083 A1 | 10/2003 |
| WO | WO2005076544 A1 | 8/2005 |

OTHER PUBLICATIONS

"High Rate Ultra Wideband PHY and MAC Standard", Internet Citation, [Online] XP002460171 Retrieved from the Internet: URL : http://www.ecma-international.org/publications/files/ECMA-ST/ECMA-368.pd>, Dec. 2005.

* cited by examiner

*Primary Examiner* — Un C Cho
*Assistant Examiner* — Peian Lou
(74) *Attorney, Agent, or Firm* — Larry Liberchuk

(57) ABSTRACT

A method (400) for creating a group shared distributed reservation in a wireless network. The method comprises collecting information about the distributed reservation availabilities of devices in the wireless network (S410); selecting a group of shared devices to be included in the group shared distributed reservation based on the collected information (S420); sending a reservation request to each device in the group of shared devices (S430); and updating the group of shared devices to include only devices that accept the reservation request (S460), thereby creating a group shared distributed reservation of medium access time slots.

20 Claims, 4 Drawing Sheets

GROUP SHARED DISTRIBUTED RESERVATION PROTOCOL

This application claims the benefit of U.S. Provisional Application No. 61/084,071 filed on Jul. 28, 2008.

The invention generally relates to block transmission techniques.

A distributed reservation protocol (DRP), defined as part of the wireless media (WiMedia) medium access control (MAC) specification, provides a mechanism for concurrent communications between devices connected in a WiMedia based wireless network. To this end, devices allocate time slots, also referred to as medium access slots (MAS), before transmitting data. The DRP allows defining a set of rules to establish, modify, maintain, release, and terminate MAS unicast and multicast reservations. A unicast reservation includes a reservation owner and a reservation target, while a multicast reservation consists of a single reservation owner and multiple reservation targets. All the targets have a multicast address and the reservation owner simultaneously sends traffic to all its targets.

In some cases, data traffic sent from a source device to a destination device passes through one or more intermediate links before the data arrives at the destination device. For example, in a wireless network 100 shown in FIG. 1, traffic from a source device 110-1 is sent over a link (hop) 120-12 to a forwarding device 110-2 and over a link 120-23 to a destination device 110-3. A multihop transmission is required when a source device cannot directly reach a destination device or when only low data rates are supported over a direct link between a source and destination device.

For such multihop transmissions, the DRP reserves a MAS for each link, while restricting the size of data frames and the MASs that can serve the transmission. As a result, there is at least one idle period at the end of each MAS for each hop of a multihop communication. As illustrated in FIG. 2 a MAS 200-N (where N is an integer number) is reserved for the link 120-12 and a MAS 200-(N+1) is reserved for the 120-23 link. In addition, there is an idle period 210 between the MASs 200-N and 200-(N+1), as data frame transmissions do not cross boundaries of a MAS, i.e., a reservation block. The DRP governs that a data frame received at the forwarding device 110-2 should wait for MAS 200-(N+1) to start prior to transmitting data to the destination device 110-3. This significantly increases the end-to-end latency between a source device and a destination device.

Therefore, it would be advantageous to provide a mechanism for reducing the latency of multihop transmissions in WiMedia based wireless networks.

Certain embodiments of the invention include a method for creating a group shared distributed reservation in a wireless network. The method comprises collecting information about the distributed reservation availabilities of devices in the wireless network; selecting a group of shared devices to be included in the group shared distributed reservation based on the collected information; sending a reservation request to each device in the group of shared devices; and updating the group of shared devices to include only devices that accept the reservation request, thereby creating a group shared distributed reservation of medium access time slots.

Certain embodiments of the invention also include a method for medium access control (MAC) layers forwarding in a wireless network. The method comprises collecting link quality information about each wireless link between a source device and its neighbour devices; collecting information about the distributed reservation availabilities of the neighbour devices; selecting a group of devices to participate in the MAC layers forwarding based on the collected information; creating a group shared distributed reservation of medium access time slots, wherein the group shared distributed reservation includes devices selected to participate in the MAC layers forwarding.

Certain embodiments of the invention further include a device forming a frame structure of a group shared distributed reservation protocol information element (GSDRP-IE) for transmission over a wireless network, wherein the GSDRP-IE includes: an element ID field having a predefined value indicating that the GSDRP-IE is an information element of a group shared distributed reservation; a control field including a stream index and a distributed reservation availability information element (IE) request; a plurality of address fields including addresses of devices to which the GSDRP-IE is targeted; and a length field designating the size of the control field and addresses fields.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
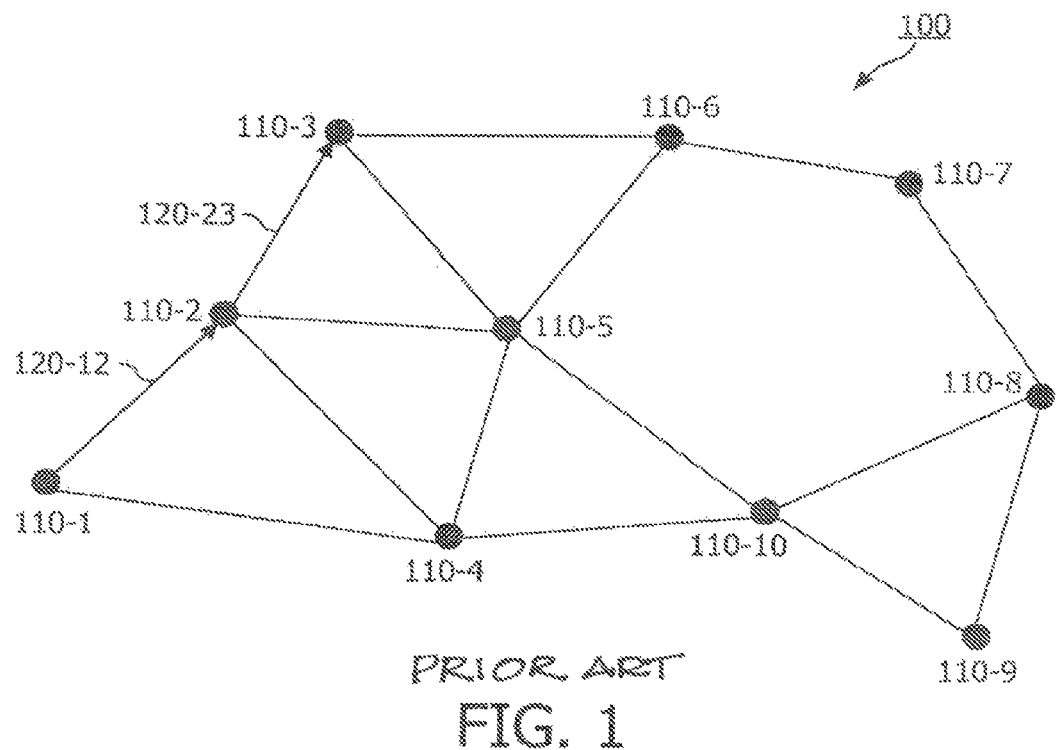
FIG. 1 is a schematic diagram of a wireless network.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A group shared distributed reservation protocol (DRP) including information elements and reservation rules are disclosed in accordance with certain embodiments of the invention. The group shared DRP can be utilized to reduce the end-to-end latency in wireless networks and, particularly in WiMedia based wireless networks. More specifically, the group shared DRP disclosed herein can be adapted to reduce the latency of multihop transmissions in WiMedia based wireless networks.

Figure 3:
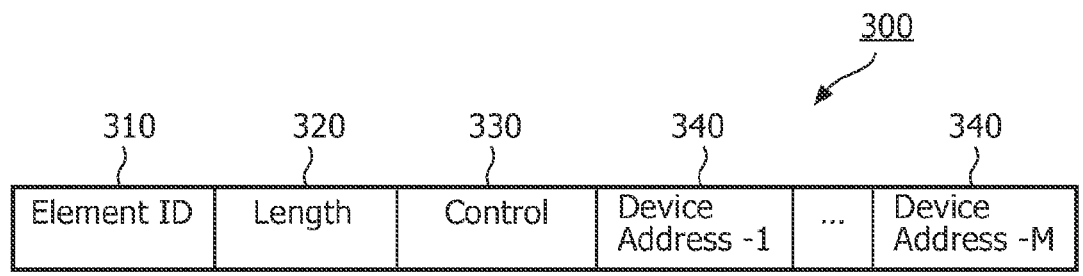
FIG. 3 is a schematic diagram of a group shared DRP information element construed in accordance with an embodiment of the invention.

The cornerstone of the group shared DRP is an information element (IE) (hereinafter "GSDRP-IE") construed in accordance with the principles of the invention. As shown in FIG. 3, a GRDRP-IE 300 includes an element ID field 310 having a predefined value indicating that the GSDRP-IE 300 is an information element of the group shared DRP, a length field 320, a control field 330, a number of M device address fields (collectively referred to as 340) to include the addresses of the devices to which the GSDRP-IE 300 is sent. The length field 320 specifies the size, i.e., number of bytes of the control 330 and address 340 fields. The control field 330 holds control information which includes, but is not limited to a stream index and a DRP availability IE request. The stream index is used to uniquely indicate the traffic flow that the GSDRP-IE 300 serves. The DRP availability information element (IE) request indicates whether or not devices should reply with their DRP availability IEs. In one embodiment of the invention, the value of the DRP availability IE request may be one of the values listed in Table 1.

TABLE 1

| Value (2 bits) | Description |
| --- | --- |
| 00 | Does not request DRP Availability IE |
| 01 | Request DRP Availability IEs from devices in address fields 340 |
| 10 | Request DRP Availability IEs from all neighbour devices |
| 11 | Reserved |

Figure 4:
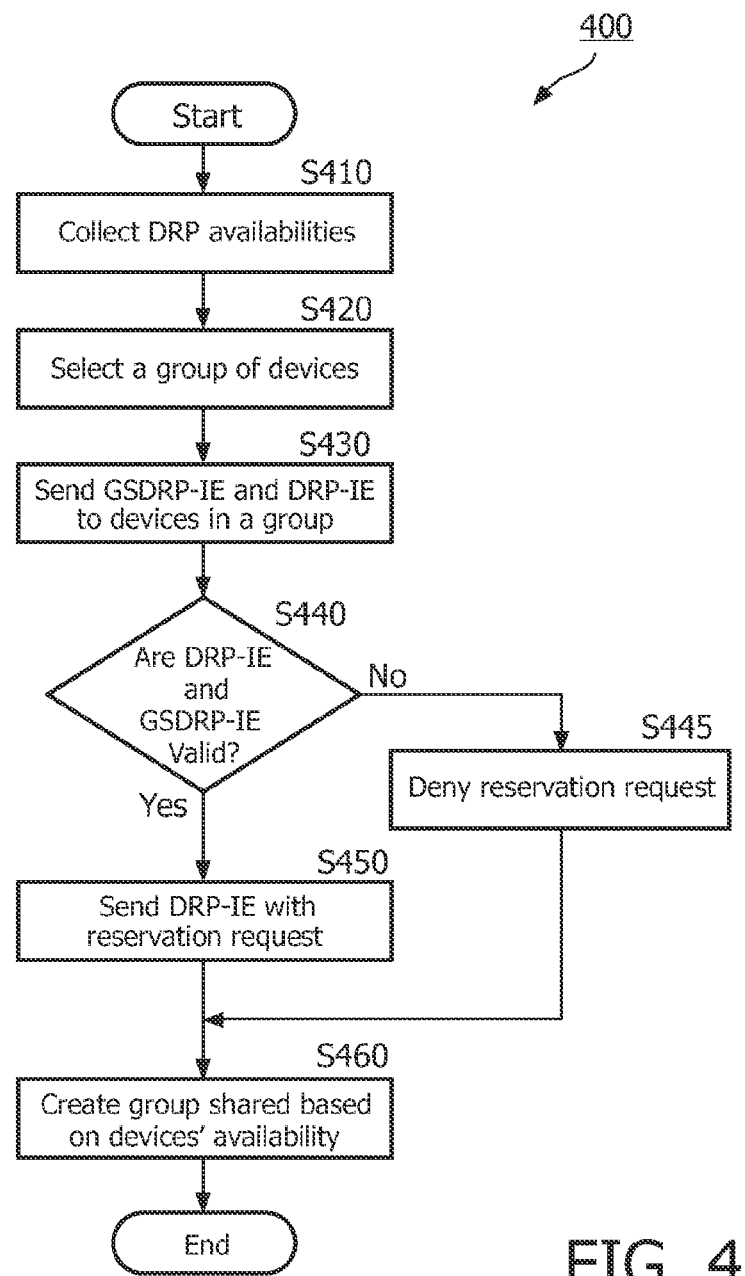
FIG. 4 is a flowchart illustrating a reservation negotiation process implemented in accordance with an embodiment of the invention.

FIG. 4 shows a non-limiting and exemplary flowchart 400 illustrating the reservation negotiation process implemented in accordance with an embodiment of the invention. The purpose of the negotiation process is to reserve a MAS for data transmissions between two devices. Two different information elements may be utilized in this process: the GSDRP-IE (e.g., a GSDRP-IE 300) and a standard DRP-IE which is defined in current versions of the DRP specification. At S410, an initiating device collects DRP availabilities of one or more devices to be included in the group shared DRP reservation. To this end, a GSDRP-IE is sent to the devices where the DRP availability IE request (in the control field 330) is set to either one of the values "01" or "10", depending on whether the availability request is from devices designated in the addresses field 340 or from neighbour devices of the initiating device. A device receiving an availability request responds back with its DRP availability IE indicating whether or not the device can reserve a MAS to the initiating device.

At S420, the initiating device selects a group of devices to be included in the group shared DRP reservation based on the collected availability information. The addresses of the selected devices are designated in a newly created GSDRP-IE. At S430 the newly created GSDRP-IE together with a standard DRP-IE are sent to all devices in the group. The GSDRP-IE and DRP-IE include the same value for their individual stream index sub-fields, which are part of the control fields of the IEs.

At S440, each device receiving the DRP-IE and GSDRP-IE checks if both IEs are valid. The check may include if both IEs have the same stream index value and if the GSDRP-IE includes the receiving device address. If both checks result in an affirmative answer, then at S450, the receiving device responds with a DRP-IE indicating if the reservation request is rejected or accepted. If the reservation request does not conflict with other existing reservations, the receiving device grants the reservation; otherwise, the receiving device denies the reservation. Specifically, when a reservation is granted, the receiving device indicates the acceptance of the reservation by sending back a DRP-IE having the same reservation status as in the received DRP-IE. A rejected reservation is indicated by specifying in the reservation status that the reservation has not been established.

If one of the checks performed at S440 results in a negative answer, at S445, the receiving device denies the reservation. At S460, all DRP-IE replies sent from devices are received at the initiating device, and the group is updated to include only devices that accepted the reservation request.

Figure 2:
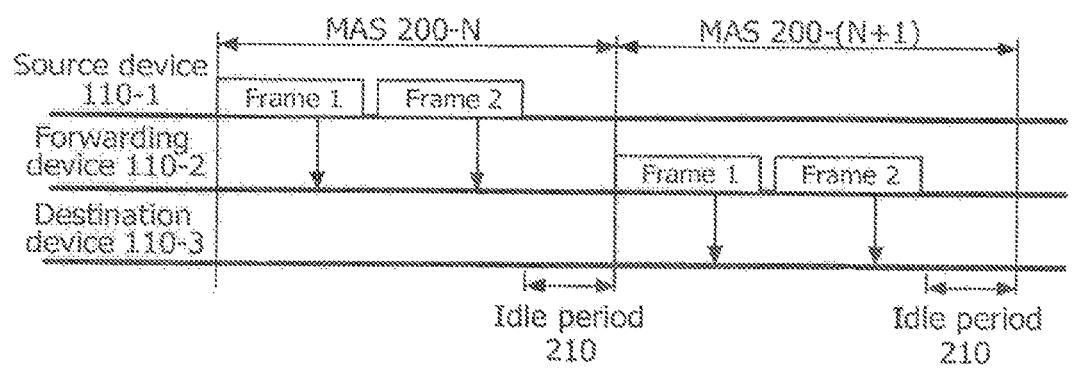
FIG. 2 is a diagram illustrating MAS reservations for multihop communication.
Figure 5:
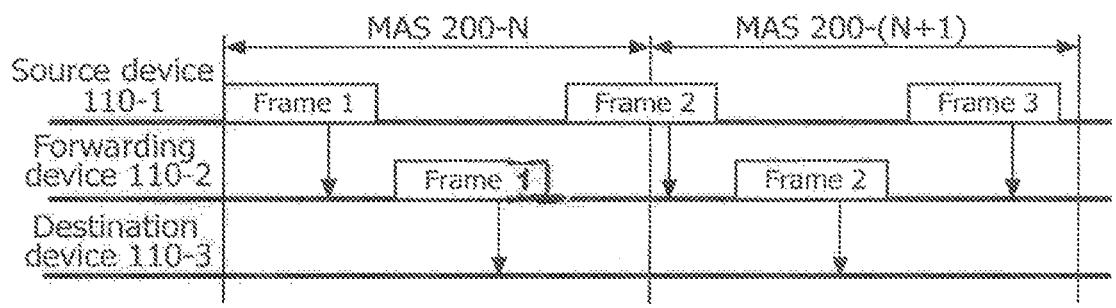
FIG. 5 is a diagram illustrating the process of MAS reservations for multihop communication using GSDRP.

It should be appreciated that by creating a group shared DRP reservation, it allows transmitting data between devices without any idle periods and more data frames can be sent during a single MAS. Referring back to the example shown in FIG. 2, the invention can be utilized to reduce the latency by creating a shared group of DRP reservations including the forwarding and destination devices 110-2 and 110-3 where the source device 110-1 is the initiating device. As shown in FIG. 5, three data frames can be sent during MASs 200-N and 200-(N+1), where no idle periods are required between frame transmissions. In addition, a frame received at the forwarding device 110-2 does not wait for start of the MAS 200-(N+1) for transmitting data to the destination device 110-3.

The negotiation process described above is only one process provided as part of the process for performing DRP reservation for a group of devices as disclosed according to certain embodiments of the invention. Other processes may include, but are not limited to, modifying and terminating a group shared DRP reservation.

To terminate a group shared DRP reservation, the reservation owner (i.e., initiating device) removes or stops sending the DRP-IE and the GSDRP-IE to devices in the group. As a result, all devices in the group stop sending their corresponding DRP-IEs.

In accordance with certain embodiments of the invention a standard DRP reservation and an existing group shared DRP reservation can be modified. Specifically, a reservation owner of a unicast/multicast DRP reservation can modify the reservation to a group shared DRP reservation. This is performed by selecting devices to join an existing DRP reservation based on their availability. Then, a reservation owner sends a GSDRP-IE with the value of the stream index field the same as that of the DRP-IE for the DRP reservation. The selected devices are included in the address fields (e.g., field 340) of the GSDRP-IE. Each device receiving the GSDRP-IE and DRP-IE can accept or reject the request to join an existing DRP reservation using the process described in detail above.

A reservation owner can also modify a DRP reservation (i.e., a reserved MASs) by changing the group of devices assigned with the reservation. With this aim, the reservation owner first determines the devices to be included in the modified group. Then, the address fields (e.g., fields 340) in the corresponding GSDRP-IE are modified to designate the addresses of only devices in the new group. A device that is removed from the group stops sending a corresponding DRP-IE, no longer associated with the established reservation. A device that is newly added into the GSDRP-IE joins the established reservation by setting an acceptance status when responding with its DRP-IE. An acceptance status is sent only if the reservation does not conflict with other existing reservations; otherwise, the device rejects the established reservation by setting a reject status in the responding DRP-IE.

Figure 6:
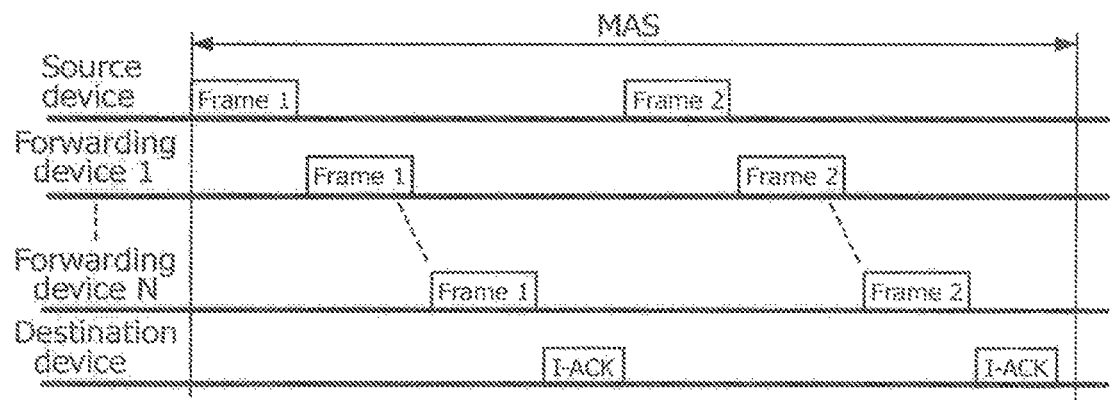
FIG. 6 is a diagram illustrating a fast MAC layers forwarding process performed using the GSDRP.

In accordance with another embodiment of the invention the group shared DRP can be utilized to implement a fast MAC layers forwarding process. As illustrated in FIG. 6, this process allows forwarding devices in the group to forward a data frame one after another in a single MAS and also to transmit multiple data frames in the same MAS.

Figure 7:
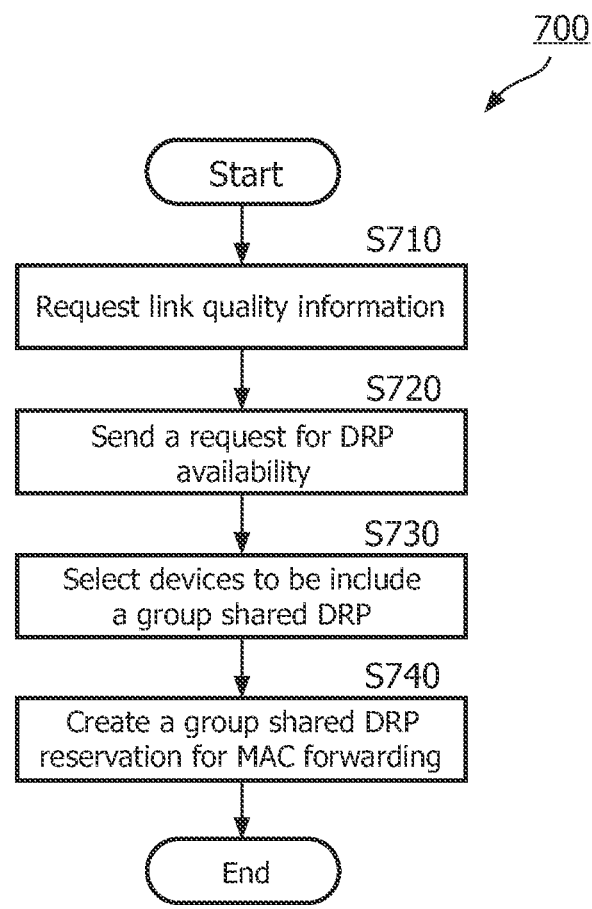
FIG. 7 is a flowchart describing the fast MAC layers forwarding process implemented in accordance with an embodiment of the invention.

FIG. 7 shows an exemplary and non-limiting flowchart 700 describing the fast MAC layers forwarding process implemented in accordance with an embodiment of the invention.

At S710, a source device requests link quality information about wireless links with its neighbor devices. At S720, the source device requests its neighbors to send their DRP availability as described above. At S730, based on the link quality information and DRP availability of devices, the source device selects a group of devices to participate in the fast MAC layer forwarding. At S740, a source device either initializes a new group shared DRP reservation or modifies an existing reservation between itself and its target device or by using the selected group of devices. When a reservation is established or successfully modified, the reserved MAS can be used for the fast MAC layer's forwarding.

The group shared DRP reservation method and information elements described herein can be implemented in communication systems including, but not limited to, a UWB based wireless personal area networks (PANs), WiMedia based wireless networks, or any time division multiple access (TDMA) or super-frame based wireless networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

I claim:

1. A method comprising:
   collecting information about distributed reservation availabilities of devices in a wireless network that uses a medium access control (MAC) protocol;
   selecting a group of shared devices to be included in a group shared distributed reservation based on the collected information;
   sending a reservation request to each device in the group of shared devices;
   updating the group of shared devices to include only devices that accept the reservation request;
   allocating as a reservation block at least first and second time-contiguous medium access slots during each of which one of more of the shared devices in said group can transmit data in accordance with a group shared distributed reservation protocol, the medium access slots being as defined by the MAC protocol; and
   transmitting data frames in the reservation block from a transmitting device to a receiving device through at least one forwarding device in the group of shared devices, the transmitting being carried out for the data frames in succession without an idle period prior to the end of the at least first time-contiguous medium access slot of said reservation block and without waiting for a start of the at least second time-contiguous medium access slot at its boundary with the at least first time-contiguous medium access slot.

2. The method of claim 1, wherein collecting the information about distributed availabilities of devices comprises sending a group shared distributed reservation protocol information element (GSDRP-IE) to the devices in the network.

3. The method of claim 2, wherein the GSDRP-IE includes at least: an element ID field having a predefined value indicating that the GSDRP-IE is an information element of a group shared distributed reservation, a control field including a stream index and a distributed reservation availability information element (IE) request, a plurality of address fields including the addresses of the devices to which the GSDRP-IE is sent, and a length field designating the size of the GSDRP-IE.

4. The method of claim 3, wherein selecting the group of shared devices comprises creating a new GSDRP-IE to include an address of each selected device.

5. The method of claim 4, wherein sending the reservation request comprises sending the new GSDRP-IE and a distributed reservation protocol information element (DRP-IE) to each device in the group shared devices.

6. The method of claim 5, wherein each device receiving the GSDRP-IE and the DRP-IE performs:
   checking if the new GSDRP-IE and the DRP-IE are valid; and
   responding with a DRP-IE indicating whether the reservation request is rejected or accepted.

7. The method of claim 1, further comprising terminating the group shared distributed reservation.

8. The method of claim 1, further comprising modifying the group shared distributed reservation.

9. The method of claim 1, wherein the wireless network is at least a WiMedia based network.

10. A non-transitory computer readable medium having stored thereon computer executable code that when executed causes a processor to perform a process of:
   collecting information about distributed reservation availabilities of devices in a wireless network that uses a medium access control (MAC) protocol;
   selecting a group of shared devices to be included in a group shared distributed reservation based on the collected information;
   sending a reservation request to each device in the group of shared devices;
   updating the group of shared devices to include only devices that accept the reservation request, and;
   allocating as a reservation block at least first and second time-contiguous medium access slots during each of which one of more of the shared devices in said group can transmit data in accordance with a group shared distributed reservation protocol, the medium access slots being as defined by the MAC protocol; and
   transmitting data frames in the reservation block from a transmitting device to a receiving device through at least one forwarding device in the group of shared devices, the transmitting being carried out for the data frames in succession without an idle period prior to the end of the at least first time-contiguous medium access slot of said reservation block and without waiting for a start of the at least second time-contiguous medium access slot at its boundary with the at least first time-contiguous medium access slot.

11. A method for medium access control (MAC) layers forwarding in a wireless network that uses a medium access control (MAC) protocol, the method comprising:
- collecting link quality information about each wireless link between a source device and the source device's neighbor devices;
- collecting information about distributed reservation availabilities of the neighbor devices;
- selecting a group of devices to participate in the MAC layers forwarding based on the collected link quality information and the distributed reservation availabilities information; and
- creating a group shared distributed reservation of medium access time slots, wherein the group shared distributed reservation includes the devices sharing a reservation block and selected to participate in the MAC layers forwarding, the reservation block comprising at least first and second time-contiguous medium access time slots during each of which one of more of the devices in said group can transmit data in accordance with a group shared distributed reservation protocol, the medium access time slots being as defined by the MAC protocol;
- wherein the MAC layers forwarding allows transmitting a plurality of data frames in the reservation block from the source device to a destination device through one or more forwarding devices, the transmitting being carried out for the data frames in succession without an idle period prior to the end of the at least first time-contiguous medium access time slot of said reservation block and without waiting for a start of the at least second time-contiguous medium access time slot at its boundary with the at least first time-contiguous medium access time slot, wherein the source device, the destination device, and the one or more forwarding devices are in the group shared distributed reservation.

12. The method of claim 11, further comprising modifying an existing group shared distributed reservation to include the selected devices.

13. A non-transitory computer readable medium having stored thereon computer executable code when executed causes a processor to perform a process of medium access control (MAC) layers forwarding in a wireless network that uses a medium access control (MAC) protocol, the process comprising:
- collecting link quality information about each wireless link between a source device and the source device's neighbor devices;
- collecting information about distributed reservation availabilities of the neighbor devices;
- selecting a group of devices to participate in the MAC layers forwarding based on the collected link quality information and the distributed reservation availabilities information; and
- creating a group shared distributed reservation of medium access time slots, wherein the group shared distributed reservation includes the devices sharing a reservation block and selected to participate in the MAC layers forwarding, the reservation block comprising at least first and second time-contiguous medium access time slots during each of which one of more of the devices in said group can transmit data in accordance with a group shared distributed reservation protocol, the medium access time slots being as defined by the MAC protocol,
- wherein the MAC layers forwarding allows transmitting a plurality of data frames in the reservation block from the source device to a destination device through one or more forwarding devices, the transmitting being carried out for the data frames in succession without an idle period prior to the end of the at least first time-contiguous medium access time slot of said reservation block and without waiting for a start of the at least second time-contiguous medium access time slot at its boundary with the at least first time-contiguous medium access time slot, wherein the source device, the destination device, and the one or more forwarding devices are in the group shared distributed reservation.

14. The method as defined in claim 1, wherein the method further comprises:
- forming a frame structure of a group shared distributed reservation protocol information element (GSDRP-IE) for transmission over a wireless network, wherein the GSDRP-IE includes:
  - an element ID field having a predefined value indicating that the GSDRP-IE is an information element of a group shared distributed reservation;
  - a control field including a stream index and a distributed reservation availability information element (IE) request;
  - a plurality of address fields including addresses of devices to which the GSDRP-IE is targeted; and
  - a length field designating the size of the control field and addresses fields,
  - wherein the distributed reservation availability information element (IE) request indicates whether or not the devices to which the GSDRP-IE is targeted should reply with their own distributed reservation availability information elements.

15. The method of claim 1 wherein at least one of the data frames is transmitted from the transmitting device through the forwarding device to the receiving device within a single one of the medium access slots.

16. The method of claim 15 wherein the receiving device is a destination device.

17. The method of claim 1 wherein a first portion of at least one of the data frames is transmitted from at least one of a) the transmitting device and b) the forwarding device during the first medium access slot and a second portion of that data frame is transmitted from said at least one of a) the transmitting device and b) the forwarding device during the second medium access slot.

18. The non-transitory computer readable medium of claim 10 wherein the group shared distributed reservation protocol enables data frames to be transmitted from the transmitting device through the forwarding device to the receiving device within a single one of the medium access slots.

19. The non-transitory computer readable medium of claim 18 wherein the receiving device is a destination device.

20. The non-transitory computer readable medium of claim 10 wherein the group shared distributed reservation protocol enables a first portion of at least one of the data frames to be transmitted from at least one of a) the transmitting device and b) the forwarding device during the first medium access slot and enables a second portion of that data frame to be transmitted from said at least one of a) the transmitting device and b) the forwarding device during the second medium access slot.

* * * * *